United States Patent [19]

Sugimoto et al.

[11] Patent Number: 5,725,443
[45] Date of Patent: Mar. 10, 1998

[54] COATED GOLF BALL

[75] Inventors: Kazushige Sugimoto, Shirakawa; Kuniyasu Horiuchi, Kobe, both of Japan

[73] Assignee: Sumitomo Rubber Industries, Ltd., Hyogo-ken, Japan

[21] Appl. No.: 549,316

[22] Filed: Oct. 27, 1995

[30] Foreign Application Priority Data

Oct. 27, 1994 [JP] Japan ................................ 6-263521

[51] Int. Cl.$^6$ ................................................ A63B 37/12
[52] U.S. Cl. ........................ 473/378; 428/447; 528/38
[58] Field of Search .............................. 473/378; 528/38; 428/447

[56] References Cited

U.S. PATENT DOCUMENTS 5,409,233 4/1995 Kennedy ................................ 273/235
5,461,109 10/1995 Blair et al. .............................. 524/839

*Primary Examiner*—Ralph H. Dean
*Attorney, Agent, or Firm*—Birch, Stewart, Kolasch & Birch, LLP

[57] ABSTRACT

The present invention provides a coated golf ball having good surface slippage for relatively long period of time. The coated golf ball of the present invention comprises a golf ball body and a paint layer formed thereon, wherein the paint layer is formed from a urethane paint which contains an isocyanate group-containing organic modified polysiloxane in an amount of 0.1 to 20% by weight based on an amount of resin components in the paint.

8 Claims, No Drawings

COATED GOLF BALL

DEFINITION OF TERMS

The term "coated golf ball" means a golf ball body which is coated with paint. Accordingly, an article which is generally called a "golf ball" by consumers and commercially available belongs to the category of "coated golf ball". In the present specification, the term "golf ball" may sometimes indicate "coated golf ball" according to common usage.

The term "golf ball body" means a golf ball before coating with paint.

FIELD OF THE INVENTION

The present invention relates to a coated golf ball comprising a golf ball body and a paint layer formed thereon wherein the paint layer has excellent coating properties and a low friction coefficient, thus high slippage.

BACKGROUND OF THE INVENTION

Golf balls are generally coated with paint in order to look beautiful or to prevent damage to the ball surface. The paint layer is required to have excellent impact resistance and high wear resistance, in order to endure repeated by golf clubs.

Paint which satisfies the above mentioned requirement is generally urethane type paint. The urethane paint provides a coating having flexibility and high elongation, but it adversely has a high friction force on its surface. The friction force leads to plugging of golf balls in transporting tubes when a large number of balls are transported for example, in a driving range apparatus and the like. This trouble is generally called "blocking".

Japanese Kokai Publication Hei 5 (1993)-269221 discloses a urethane type clear paint which contains a hydroxyl group-containing organic modified polysiloxane. The clear paint provides a coating having good impact resistance and high slippage. The hydroxyl group-containing organic modified polysiloxane has such a high surface activity as to spread on the surface of the coating. The hydroxyl group-containing organic modified polysiloxane also has hydroxy groups which are reacted with the urethane binder resin to remain on the surface portion of the coating. Accordingly, the polysiloxane backbones which are liable to be present on the surface portion of the coating show sufficient slippage.

However, in driving ranges and the like, golf balls are dipped in cleaning solution or exposed to rain. When the surface of the golf balls is contacted with water in the cleaning solution or rain, unreacted hydroxyl group-containing organic modified polysiloxane or low molecular weight resin components (including polysiloxane) are liable to elute out into water, resulting in deterioration of slippage.

SUMMARY OF THE INVENTION

Thus, the present invention is to provide a coated golf ball comprising a golf ball body and a paint layer formed thereon, wherein the paint layer is formed from a urethane paint which contains an isocyanate group-containing organic modified polysiloxane in an amount of 0.1 to 20% by weight based on an amount of resin components in the paint. The golf ball of the present invention has surface slippage and maintains slippage for a long period of time.

DETAILED DESCRIPTION OF THE INVENTION

The isocyanate group-containing organic modified polysiloxane employed in the present invention has isocyanate groups which have high reactivity with binder resin, and therefore the polysiloxane components are firmly anchored with the binder resin of the paint. Thus, the polysiloxane components are not eluted out into water even if the golf balls are repeatedly contacted with water. The isocyanate group-containing organic modified polysiloxane also has surface activity so as to spread on the surface portion of the coating and provides excellent slippage. The paint layer of the present invention also has other necessary physical properties for golf balls, such as impact resistance.

The isocyanate group-containing organic modified polysiloxane is compatible with the binder resin of the urethane paint and is capable of reacting with the binder resin. The isocyanate group-containing organic modified polysiloxane has a polysiloxane chain and a long alkyl group or polyester group grafted or block-copolymerized with the polysiloxane chain, wherein the alkyl group or polyester group has one or more isocyanate groups.

The isocyanate group-containing organic modified polysiloxane can be made by chemical reaction, but is generally commercially available. Examples of them are EFKA-86, EFKA-88, EFKA- 8835 commercially available from EFKA CHEMICALS Co., Ltd. The isocyanate group-containing organic modified polysiloxane is available in a form of a solution in which the modified polysiloxane is dissolved in organic solvent, such as ketones (e.g. butylacetate acetone), hydrocarbons (e.g. toluene) and the like.

The isocyanate group-containing organic modified polysiloxane is formulated into the urethane paint. The urethane paint is one which is known to the art in the golf ball field, preferably a two package type polyurethane paint. The two package type polyurethane paint is generally composed of polyol components and polyisocyanate components. The polyol component includes a condensate of polybasic acid and polyhydric alcohol, a modified compound thereof with fatty acid. The polyol component can also be an acryl polyol. Preferred is a polyester polyol resin having one or more hydroxyl groups or the acryl polyol. The polyisocyanate component includes tolylene diisocyanate, hexamethylene diisocyanate, isophorone diisocyanate, lysine diisocyanate, lysine triisocyanate, or an adduct, biuret or isocyanulate thereof. When the isocyanate group-containing organic modified polysiloxane is formulated into the urethane paint, especially two package urethane paint, it is formulated into the isocyanate component or mixed at the time of mixing the isocyanate component with the polyol component.

The isocyanate group-containing organic modified polysiloxane is present in an amount of 0.1 to 20% by weight, preferably 1 to 15% by weight, based on the weight of the resin component in the urethane paint. When the paint contains pigment, filler and solvent other than resin component, the weight of the resin component means a weight of a portion from which pigment, filler and solvent are subtracted. If a curing agent is present in the urethane paint, it is counted as the resin component. If the amount is less than 0.1% by weight, the resulting golf ball does not have sufficient slippage. If it is more than 20% by weight, the paint layer is too flexible and has poor wear resistance.

The golf ball body may be a one-piece ball obtained by vulcanizing and molding a rubber composition mainly containing cis-1, 4polybutadiene rubber. It also may be a two-piece ball which is obtained by vulcanizing a rubber composition mainly containing cis-1,4-polybutadiene rubber to form a solid core, which is then covered with an ionomer cover. In addition, the golf ball body may be a thread-wound ball comprising a thread wound core and a cover layer mainly composed of trans-polyisoprene, formed on the thread wound core. The thread wound core is composed of a liquid or solid center and a thread rubber layer wound on the center.

A coating method for the paint is not specifically limited, but preferably includes air gun coating or electrostatic coating, and the like.

According to the present invention, the paint layer into which the isocyanate group-containing organic modified polysiloxane is formulated is present in the paint layer of the golf ball, but preferably is present in the outermost layer. Concretely, the golf ball body is coated with a white enamel paint which is generally a polyurethane paint used for golf balls and then coated with the urethane paint of the present invention. The urethane paint of the present invention may be directly coated on the golf ball body.

According to the present invention, the paint layer of the golf ball keeps excellent physical properties, such as impact resistance and also has sufficient slippage for preventing the blocking of the golf balls. The slippage properties remains for a long period of time, even if the balls are contacted with water.

EXAMPLES

The present invention is illustrated by the following Examples which, however, are not to be construe the present invention to their details.

Examples and Comparative Examples

A one-piece golf ball body which had been prepared by a conventional method was spray-coated a two-package urethane clear paint, into which each one of the following 6 compounds A-F was added, and then dried to cure to form a paint layer. The urethane clear paint was mainly composed of polyesterpolyol resin and polyisocyanate resin in a weight ratio of 4:1 (polyesterpolyol resin:polyisocyanate resin) based on solid content. The urethane paint was diluted with thinner (a mixture of toluene, ethyl acetate and methyl ethyl ketone) to a suitable viscosity for coating. The 6 compounds A-F are listed in the following Table 1 in which a content of the compound in the above clear urethane paint is shown as % by weight based on the solid content of the paint. As a contrast, an example wherein no compound was formulated, thus only the clear urethane paint, was also conducted and shown as G or Comparative Example G. In the compounds A-F, E and F were comparative examples which are outside the claimed subject matter of the present invention.

TABLE 1

| Compound No. | Name of the compound | Content (% by weight) |
| --- | --- | --- |
| A | Isocyanate group-containing organic modified polysiloxane | 0.1 |
| B | Isocyanate group-containing organic modified polysiloxane | 3.0 |
| C | Isocyanate group-containing organic modified polysiloxane | 6.0 |
| D | Isocyanate group-containing organic modified polysiloxane | 12 |
| E | Hydroxyl group-containing organic modified polysiloxane | 0.05 |
| F | Hydroxyl group-containing organic modified polysiloxane | 0.1 |
| G | Contrast (no compound) | 0 |

The isocyanate group-containing organic modified polysiloxane was EFKA-88 available from EFKA CHEMI-CALS Co., and the hydroxyl group-containing organic modified polysiloxane was Byk370 available from BYK Chemie Japan (hydroxyl group-containing polyester modified polydimethylsiloxane: 25% content).

The coated golf balls were dipped in water for 1 day, 7 days, 30 days, 90 days or 180 days and each golf ball were evaluated by slippage property with time. The slippage property was evaluated by directly rubbing two balls with each other. The results are shown in Table 1.

TABLE 2

| | | Examples | | | | Comparative Examples | | |
| --- | --- | --- | --- | --- | --- | --- | --- | --- |
| | | A | B | C | D | E | F | G |
| Surface slippage of golf ball | No dipping | Ex | Ex | Ex | Ex | Ex | Ex | P |
| | One day dipping | Gd | Gd | Gd | Gd | P | Gd | P |
| | 7 days dipping | Gd | Gd | Gd | Gd | P | P | P |
| | 30 days dipping | Gd | Gd | Gd | Gd | P | P | P |
| | 90 days dipping | Gd | Gd | Gd | Gd | P | P | P |
| | 180 days dipping | Gd | Gd | Gd | Gd | P | P | P |

Ex: Excellent,
Gd: Good,
P: Poor (when the balls are rubbed with each other, the balls are caught slightly.

As is apparent from the above results, the paint of the present invention, which contains the isocyanate group-containing organic modified polysiloxane, provides good surface slippage for relatively long period of time.

What is claimed is:

1. A coated golf ball comprising a golf ball body and a paint layer formed thereon, wherein said paint layer is formed from a urethane paint which contains an isocyanate group-containing organic modified polysiloxane in an amount of 0.1 to 20% by weight based on an amount of resin components in the paint.

2. The coated golf ball according to claim 1 wherein said isocyanate group-containing organic modified polysiloxane has a polysiloxane chain and a long alkyl group or polyester group grafted or block-copolymerized with the polysiloxane chain, wherein the alkyl group or polyester group has one or more isocyanate groups.

3. The coated golf ball according to claim 1 wherein said urethane paint is a two package type polyurethane paint which comprises polyol components and polyisocyanate components.

4. The coated golf ball according to claim 1 wherein said urethane paint further comprises filler, and solvent.

5. The coated golf ball according to claim 1 wherein said golf ball body is a one-piece ball obtained by vulcanizing and molding a rubber composition mainly containing cis-1, 4-polybutadiene rubber.

6. The coated golf ball according to claim 1 wherein said golf ball body is a two-piece ball which is obtained by vulcanizing a rubber composition mainly containing cis-1, 4-polybutadiene rubber to form a solid core, which is then covered with an ionomer cover.

7. The coated golf ball according to claim 1 wherein said golf ball body is a thread-wound ball comprising a thread wound core and a cover layer mainly composed of trans-polyisoprene, formed on the thread wound core.

8. The coated golf ball according to claim 1 wherein said isocyanate group-containing organic modified polysiloxane is present in an amount of 1 to 15% by weight based on the amount of resin components in the paint.

* * * * *